(12) United States Patent
Sung

(10) Patent No.: US 7,085,125 B2
(45) Date of Patent: Aug. 1, 2006

(54) CARBON NANOTUBE DEVICES AND USES THEREFOR

(76) Inventor: Chien-Min Sung, No. 4, Lane 32, Chung-Cheng Road, Tansui, Taipei County (TW) 23911

( * ) Notice: Subject to any disclaimer, the term of this patent is extended or adjusted under 35 U.S.C. 154(b) by 0 days.

(21) Appl. No.: 10/394,435

(22) Filed: Mar. 21, 2003

(65) Prior Publication Data

US 2006/0126268 A1    Jun. 15, 2006

Related U.S. Application Data

(60) Provisional application No. 60/366,591, filed on Mar. 21, 2002.

(51) Int. Cl.
*H01G 9/00* (2006.01)

(52) U.S. Cl. ............. 361/502; 361/504; 361/508; 361/512; 361/516; 361/523

(58) Field of Classification Search ............ 313/495, 313/336, 351, 309, 496; 361/502–504, 508–512, 361/516–519, 523–528; 445/50–52
See application file for complete search history.

(56) References Cited

U.S. PATENT DOCUMENTS

| | | | | |
|---|---|---|---|---|
| 3,875,041 | A * | 4/1975 | Harvey et al. ............... 204/273 |
| 5,811,926 | A * | 9/1998 | Novich ........................ 313/495 |
| 5,872,422 | A * | 2/1999 | Xu et al. ..................... 313/311 |
| 6,180,029 | B1 * | 1/2001 | Hampden-Smith et al. . 313/495 |
| 6,239,547 | B1 * | 5/2001 | Uemura et al. .............. 313/495 |
| 6,250,984 | B1 * | 6/2001 | Jin et al. ..................... 313/495 |
| 6,400,091 | B1 * | 6/2002 | Deguchi et al. ........... 315/169.1 |
| 6,422,450 | B1 * | 7/2002 | Zhou et al. ............ 219/121.85 |
| 6,426,590 | B1 * | 7/2002 | Chung et al. ............... 313/496 |
| 6,440,610 | B1 * | 8/2002 | Sheem et al. ............. 429/231.8 |
| 6,456,691 | B1 * | 9/2002 | Takahashi et al. .......... 378/122 |
| 6,514,113 | B1 | 2/2003 | Lee et al. |
| 6,528,753 | B1 | 3/2003 | McBennett |
| 6,553,096 | B1 * | 4/2003 | Zhou et al. ................. 378/122 |
| 6,692,717 | B1 * | 2/2004 | Smalley et al. ......... 423/445 B |
| 2003/0042834 | A1 * | 3/2003 | Dean et al. ................. 313/309 |

OTHER PUBLICATIONS

Chen, K.H., C.T. Wu, J.S. Hwang, C.Y. Wen, L.C. Chen, C.T. Wang, K.J. Ma, "Electron beam induced formation of carbon nanorods," Journal of Physics and Chemistry of Solids 62 (2001) 1561-1565.

(Continued)

*Primary Examiner*—Nguyen T. Ha
(74) *Attorney, Agent, or Firm*—Thorpe North & Western, LLP

(57) ABSTRACT

Electrical devices which incorporate electrodes coated with carbon nanotubes. An anode is placed in conductive relationship with the coated electrode. A gas or liquid medium is placed between the electrode and anode which medium also participates in the transfer of electrons. Using specific gas media in combination with nanotube coated electrodes allows for the production of electromagnetic radiation sources which have extended life, reduced power requirements, and significantly decreased operating temperatures. Likewise carbon nanotube coated electrodes can be advantageously utilized in fuel cells, electrodeposition, and similar applications greatly extending the life of electrodes and improving the electron emission properties.

18 Claims, 2 Drawing Sheets

OTHER PUBLICATIONS

Sohn, Jung Inn, Seonghoon Lee, Yoon-Ho Song, Sung-Yool Choi, Kyoung Ik Cho, Kee-Soo Nam, "Large field emission current density from well-aligned carbon nanotube field emitter arrays," Current Applied Physics 1 (2001) 61-65.

Zhu, W., C. Bower, G.P. Kochanski, S. Jin, "Field emission properties of diamond and carbon nanotubes," Diamond and Related Materials 10 (2001) 1709-1713.

* cited by examiner

CARBON NANOTUBE DEVICES AND USES THEREFOR

PRIORITY DATA

This patent application claims priority to U.S. Provisional Patent Application Ser. No. 60/366,591, filed on Mar. 21, 2002, which is incorporated herein by reference.

FIELD OF THE INVENTION

The present invention relates generally to carbon nanotube devices that are capable of emitting electrons and to uses therefor. Accordingly, the present application involves the fields of physics, chemistry, electricity, and material science.

BACKGROUND OF THE INVENTION

Thermionic and field emission devices are well known and are used in a variety of applications. Generally, thermionic electron emission devices operate by ejecting hot electrons over a potential barrier and field emission devices operate by causing electrons to tunnel through the barrier. Examples of specific devices include those disclosed in U.S. Pat. Nos. 6,229,083; 6,204,595; 6,103,298; 6,064,137; 6,055,815; 6,039,471; 5,994,638; 5,984,752; 5,981,071; 5,874,039; 5,777,427; 5,722,242; 5,713,775; 5,712,488; 5,675,972; and 5,562,781 each of which is incorporated herein by reference.

Although basically successful in many applications (i.e. used in cathode ray tubes, and other vacuum devices), thermionic devices have been less successful than field emission devices, as field emission devices generally achieve a higher current output under an electrical field of the same intensity. Despite this advantage, most field emission devices suffer from a variety of disadvantages that limit their potential uses, including materials limitations, versatility limitations, cost effectiveness, lifespan limitations, and efficiency limitations, among others.

Electrodes are widely used in electronic devices and power sources. Some common applications for electrodes are in fluorescent light bulbs, electrochemical cells, and similar devices. However, in many applications these electrodes become corroded or in some cases covered in deposits which dramatically reduce their performance, reliability, and useful life. For example, fluorescent lights generally have low luminescence as compared to filament type light sources. Typical electrodes are operated at high temperatures and are made of materials which are conducive to either chemical reaction and/or mechanical attraction to common compounds used in conjunction with electrodes. Various efforts have been made to improve reliability and performance of electrodes through the use of specific materials and/or coatings. For example, electrodes are sometimes coated with a conductive material to improve the lifespan of the electrode. Such coatings are performed by brazing, deposition, and similar techniques. However, such coatings only marginally improve performance and lifespan. Some metallic coatings have proven more effective at improving electrode lifespan, however suffer from increased costs of manufacture.

As such, devices that provide a high voltage output, have extended life, and operate at low temperatures continue to be sought through ongoing research and development efforts.

SUMMARY OF THE INVENTION

Accordingly, in one aspect of the present invention, a carbon nanotube electrical device is provided which includes a cathode coated with carbon nanotubes for emitting electrons. An anode can be placed in an electrically conductive relationship with the cathode, such that there is a space between the cathode and anode. In accordance with the present invention, a gas or liquid medium is placed in the space which participates in the transfer of electrons across the space.

In one detailed aspect of the present invention, the carbon nanotubes are grown on the cathode to form substantially aligned carbon nanotubes.

In another aspect of the present invention, a method for improving performance of cathode-bearing device includes the step of coating the cathode with carbon nanotubes. In one aspect, such a device may additionally include an anode coupled to the cathode and defining a space therebetween which is filled with either a liquid or a gas that aids in the conduction of electrons from the cathode to the anode. A number of such devices are known, such as fluorescent light bulbs, etc.

In yet another more detailed aspect of the present invention, the cathode operates at a temperature below about 65° C.

In still another aspect of the present invention, the carbon nanotubes are attached to the cathode by forming a mixture of carbon nanotubes and binder and then applying the mixture to the cathode.

In one aspect of the present invention, a gas medium is placed in the space such that upon interaction with electrons produces electromagnetic radiation.

In another aspect of the present invention, the space is filled with an aqueous solution containing a dissolved metal. An electric potential is then applied across the space sufficient to cause a portion of the dissolved metal to deposit on a surface.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Figure 2:
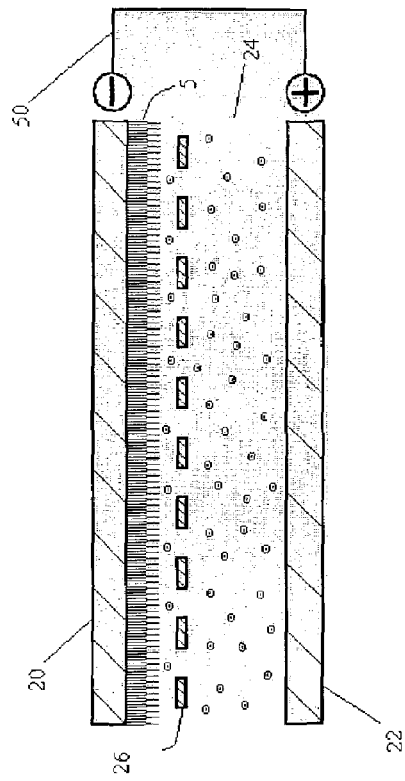
FIG. 2 shows a side view of a carbon nanotube device assembled with various components to form a field emitter as known in the prior art.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," and, "the" include plural referents unless the context clearly dictates otherwise. Thus, for example, reference to "a nanotube" includes one or more of such nanotubes, reference to "a carbon source" includes reference to one or more of such carbon sources, and reference to "a CVD technique" includes reference to one or more of such CVD techniques.

Definitions

In describing and claiming the present invention, the following terminology will be used in accordance with the definitions set forth below.

As used herein, "aspect ratio" when used in connection with a carbon nanotube refers to the ratio of height to width, or diameter.

As used herein, "carbon" refers to carbon atoms, and to inorganic compounds containing a substantial number of carbon atoms bonded together. A variety of carbon atom bonding arrangements may be found in such compounds, including without limitation, $sp^1$, $sp^2$, and $sp^3$ bonding coordination, as well as distorted tetrahedral coordination. Examples of such material include without limitation, diamond, diamond-like carbon, amorphous diamond, and graphite. Notably, a variety of other elements may be included in the carbonaceous material as either impurities, or as a dopant, including without limitation, hydrogen, sulfur, phosphorous, boron, nitrogen, silicon, tungsten, and mixtures thereof.

As used herein, "carbon nanotube" refers to nano-scale tubes made substantially of carbon atoms, having a structure based on graphite basal planes that are wrapped or curled to become a tube. Carbon nanotubes are well known in the art, and a number of structural variations are known. Carbon nanotubes can have a diameter of from about 2 angstroms to over 20 micrometers. However, in one aspect, the carbon nanotubes may be single walled tubes with a diameter of about 13.53 angstroms. In another aspect, the nanotubes may be multiple walled, and may have a diameter of up to about 20 micrometers.

As used herein, "metallic" refers to a metal, or an alloy of two or more metals. A wide variety of metallic materials are known to those skilled in the art, such as aluminum, copper, chromium, iron, steel, stainless steel, titanium, tungsten, zinc, zirconium, molybdenum, etc., including alloys and compounds thereof.

As used herein, "positive pressure" refers to a pressure greater than atmospheric pressure.

As used herein, "substantial" when used in reference to a quantity or amount of a material, or a specific characteristic thereof, refers to an amount that is sufficient to provide an effect that the material or characteristic was intended to provide. Further, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, "electron affinity" refers to the tendency of an atom to attract or bind a free electron into one of its orbitals. Further, "negative electron affinity" (NEA) refers to the tendency of an atom to either repulse free electrons, or to allow the release of electrons from its orbitals using a small energy input. Those of ordinary skill in the art will recognize that certain geometric configurations, such as the small radius of carbon nanotubes also facilitates the emission of electrons from a material that actually has a positive electron affinity.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 micrometer to about 5 micrometers" should be interpreted to include not only the explicitly recited values of about 1 micrometer to about 5 micrometers, but also include individual values and sub-ranges within the indicated range. Thus, included in this numerical range are individual values such as 2, 3, and 4 and sub-ranges such as from 1–3, from 2–4, and from 3–5, etc.

This same principle applies to ranges reciting only one numerical value. Furthermore, such an interpretation should apply regardless of the breadth of the range or the characteristics being described.

The figures described in more detail below are merely provided as illustrations of several embodiments of the present invention and are not intended to be limiting. Further, the figures are not drawn to scale for purposes of clarity and actual dimensions, i.e. especially the carbon nanotubes, will likely differ from those depicted in many specific embodiments.

Invention

The present invention provides various uses for certain carbon nanotube devices. Carbon nanotubes are best known for their use as field emitters in field emission displays, and similar applications. In these cases, an electric field is used to create a positive bias and facilitate electron flow out of the carbon nanotubes. Carbon nanotubes are especially good at emitting electrons in a vacuum under an induced field because of their electrically conductive properties and specific geometric configuration. Such nanotube configuration essentially imparts a negative electron affinity (NEA) to the carbon, which allows electrons to flow easily therefrom under an induced field. Specific examples of carbon nanotube devices, as well as methods for the making thereof may be found in U.S. Pat. Nos. 6,221,330; 6,282,907; 6,325,909; 6,331,209; 6,331,690; 6,353,016; 6,346,189; and 6,350,488, each of which is incorporated herein by reference.

It has now been found that carbon nanotubes may be compelled to produce electrons upon input of a sufficient amount of photonic or phononic energy, and that the reverse principle of absorbing heat, or cooling an area by inducing electron flow, is also feasible. It has also been found that when coupled to an electrode, that carbon nanotubes are capable of generating electrons in a positive pressure environment. As such, the use of carbon nanotube devices in a variety of specifically desirable applications has become available.

Figure 1:
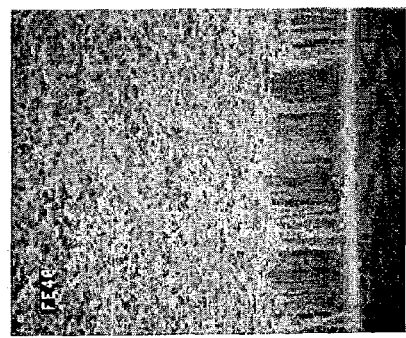
FIG. 1 shows a perspective view of carbon nanotubes as known in the prior art for use in accordance with one embodiment of the present invention.

The carbon nanotube devices used in the present invention may contain a variety of structural features that aid electron emission. Referring now to FIG. 1, is shown perspective view of carbon nanotubes as known in the art. Typically, such nanotubes are coupled to a substrate, such as an electrode, or other substrate, and used in connection with other components as shown in FIG. 2.

Referring now to FIG. 2, is shown one embodiment of a field emitter using carbon nanotubes as known in the prior art. Carbon nanotubes 5 are coupled to an electrode 20 which acts as a substrate, to form a cathode, and an anode 22 is placed opposite the carbon nanotubes, with a vacuum space 24 therebetween. A gate 26 that is capable of inducing an electric field and creating a positive bias is placed in the vacuum space, and held adjacent to the carbon nanotubes. In use, an electric field is applied to the gate, creating a positive bias that facilitates the flow of electrons into the vacuum space and to the anode. Those of ordinary skill in the art will readily recognize other components (not shown) could be added to the assembly of FIG. 2 in order to achieve a specific purpose, such as connecting lines, power sources, etc. For example, in field emission display applications, the anode may have a phosphor element, or other element that emits light upon receipt of electrons. Further, some elements not shown may be required for certain functions, such as an electric input line to provide electricity to gate 26 to provide electricity to create a positive bias.

Other components may be included in the carbon nanotube devices used in the present invention, in order to accommodate a specific performance. For example, referring now to FIG. 3, a carbon nanotube device 30 is shown, having carbon nanotubes 5, coupled to an electrode 20, which acts as a substrate and forms a cathode. Further, an energy collector 32 may be optionally coupled to the electrode. The energy collector may be included to enhance the collection and transmission of phononic or photonic energy to the carbon nanotubes. As such, the energy collector may be made of a variety of materials known to those skilled in the art for their high energy collection and transfer properties, and may be specifically selected to accommodate the type of energy being collected. The collector may be included when using the carbon nanotube device as an electrical generator, and also may be used when using the carbon nanotubes as a cooling device. In the latter capacity, the collector aids in the absorption of heat and contributes to the cooling effect achieved. In one aspect, the collector may be a carbon black material.

It is to be noted however, that the collector is optional, and that heat, photonic or phononic energy may be absorbed directly by the carbon nanotubes in some aspects of the invention. In one aspect, the electrode, or substrate may be transparent (i.e. electrically conductive glass) that allows the direct application of photonic energy to the carbon nanotubes.

A number of additional modifications may be made in order to accomplish a desired use. For example, the aspect ratio of the carbon nanotubes may be varied. In one embodiment, the carbon nanotubes may have a length that is from at least about 5 times to about 100 times greater than their diameters. In another aspect, the density of nanotubes upon the substrate may be varied, and may be up to 10 billion nanotubes per $cm^2$. Further, peripheral components may be varied. For example, the gate 26 may be either coupled to the carbon nanotubes 5, using an insulator as known in the prior art, that may also serve as a spacer or a support. In another aspect, the gate may be a metal screen or mesh. Such a screen or mesh may be supported in the device at lateral ends thereof, and therefore be spaced apart from the emission surface by only vacuum space. When so configured, the need for an insulator as recited above is removed.

Suitable electrically conductive materials and configurations will be readily recognized by those skilled in the art for the electrode 20 and the anode 22. Such materials and configurations may be determined in part by the function of the device into which the assembly is incorporated. Additionally, steps may be taken to reduce or minimize the repulsion of electrons from the carbon nanotubes by other electrons already in the vacuum space, such as by vaporizing an amount of low energy cations. A number of cations are suitable for such a purpose, including without limitation, cations of Li, Na, K, Rb, Cs, Fr, Be, Mg, Ca, Sr, Ba, and mixtures thereof. However, in one aspect, the cation may be a Cs cation.

Figure 3:
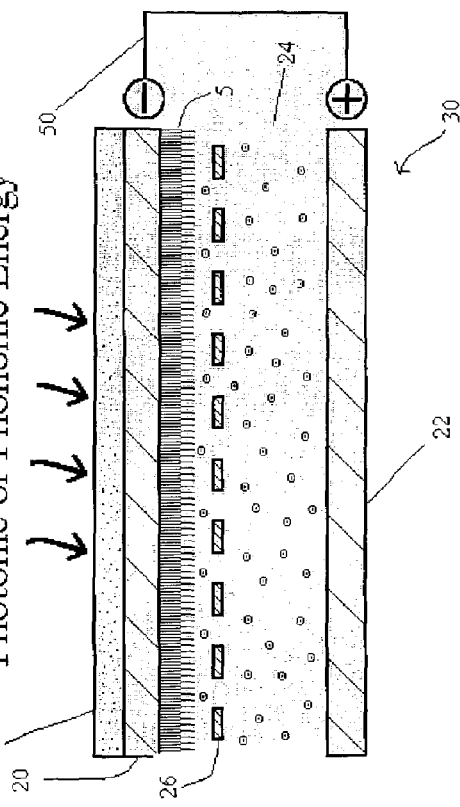
FIG. 3 shows a side view of a carbon nanotube device assembled with various components to form a device that is capable of being used as an electrical generator, or as a cooling device, in accordance with one embodiment of the present invention.

In one aspect of the present invention, a carbon nanotube device may be utilized for the generation of electricity, including large scale electricity production, by absorbing photonic or phononic energy from either heat, light, or other energy sources. When used as an electrical generator to generate electricity from heat or light, the carbon nanotube device may be configured as shown in FIG. 3. Heat or light energy received into the energy collector is then transferred to the carbon nanotubes 5, which causes sufficient vibration of the carbon electrons to cause them to become dislodged and flow out of the carbon nanotubes. Notably, the gate 26 is optional, and may not be used under certain conditions, while it may be used under others. In one aspect, the energy input into the carbon nanotube device may be thermal energy, having a temperature of from about 300° C. to about 1200° C. In another aspect, the temperature may be above about 500° C. In another aspect, the temperature may be above about 1000° C. Those of ordinary skill in the art will recognize other specific device configurations and components that may be employed to accomplish the desired purpose of generating electricity, and such is considered to be within the scope of the present invention.

As electrons flow from the nanotubes, the anode becomes bombarded with the electrons. The impact of the electrons on the anode typically generates a substantial amount of heat. This problem is further accelerated if the surface of the anode is rough. Specifically, any sharp points on the anode attract a higher rate of current, somewhat akin to a lightening rod, and therefore may burn out, or become molten. As a result, in one aspect of the devices used with the present invention, the anode may have an ultra smooth surface in order to reduce the generation of heat. In another aspect, the anode may be coated with a refractory metal, such as metals selected from the group consisting of W, Mo, Cr, Ta, Pt, Ti, Hf, and alloys thereof.

In another aspect of the present invention, a carbon nanotube device having the basic components as shown in FIG. 3, may be used as a cooling device, or heat spreader to cool an area adjacent thereto. In use, the energy collector is placed adjacent to, or in contact with, an area to be cooled. An electrical current is then sent through the gate 26, to induce an electric field and create a positive bias toward the anode 22 that is sufficient to induce the flow of electrons out of the carbon nanotubes 5. As the electrons become dislodged from the carbon atom orbitals, an energy draw is created that facilitates the absorption of energy, and removes heat energy through the energy collector 32 from the adjacent area. In one aspect, the absorption of thermal energy may cool the adjacent area down below 100° C.

Figure 4:
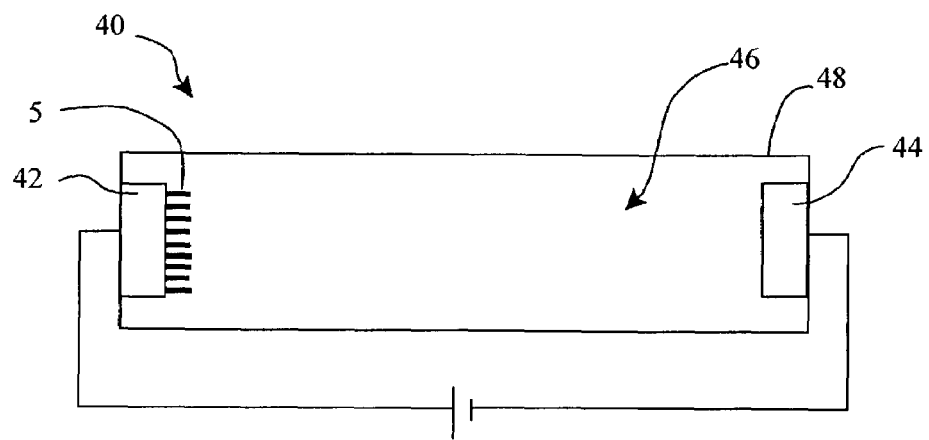
FIG. 4 shows a side view of a carbon nanotube device in accordance with one embodiment of the present invention using a gas medium.

In yet another aspect of the invention, carbon nanotube devices may also be used to generate electrons in applications that have a small or partial vacuum pressure, atmospheric pressure, or positive pressure. In this case, the gate 26 is not used. For example, electrodes and cathodes may be designed to utilize the carbon nanotubes, such as coating the metal electron emitter in a fluorescent light bulb. Referring now to FIG. 4, a light source incorporating carbon nanotube electron emitters in accordance with the present invention is shown generally at 40. An electrode 42 is coated with nanotubes to form a cathode. An anode 44 is placed in an electrically conductive relationship with the cathode. The cathode and anode are separated by space 46 across which electrons can be transferred. The anode can be made of any conductive material. As discussed above, a smooth surface is generally desirable although a variety of anode configurations are known to those skilled in the art.

In one aspect of the present invention, a gas or liquid medium is placed in space 46 and preferably confined therein by an outer housing 48. The outer housing can be cylindrical, rectangular, or any other shape and can be formed of a variety of materials such as, but not limited to, glass, polymers, metal, or combinations thereof. For lighting applications the housing material is preferably transparent or translucent. In connection with the present invention, suitable gas mediums include without limitation, argon, neon, xenon, krypton, and mixtures thereof. Typically, in an argon medium an element such as mercury is included which vaporizes upon heating by the gas medium. These elements will produce ultraviolet radiation upon excitation by interaction with transferred electrons and/or heated gas. Any other element could also be used which produces electromagnetic radiation of a particular frequency upon excitation by electrons and such are well known to those skilled in the art. Similarly, certain gas media such as neon, xenon, krypton and others emit various colored light directly upon excitation by transferred electrons. Typically, when argon is the gas medium a fluorescent phosphor powder can be coated on the interior surface of the outer housing such that ultraviolet radiation produced by the contained gas medium is absorbed and converted to visible light. Such a phosphor powder is optional, in which case the ultraviolet or other electromagnetic radiation produced would be emitted from the device such as in "black" lights or other applications where such radiation is desirable. Other known lighting configurations and gas media are also considered within the scope of the present invention.

Not only do the carbon nanotubes of the present invention act to protect and greatly lengthen the life of the metal electrode, for example, by preventing degradation, but also aid in electron emission. As a result, the voltage required to illuminate the gas contained within the light bulb would be greatly reduced, which in turn reduces the temperature of the metal electron emitter. Typical hot cathodes operate at temperatures up to around 900° C., while many cold cathodes operate in the range of from 80° to 150° C. Cathodes coated with nanotubes in accordance with the present invention can operate at temperatures below this range such as below about 65° C. and in some cases below about 50° C. Such a combination of advantages would work together to significantly lengthen the life of the fluorescent light. Further, other devices which require the emission of electrons in order to create light would reap similar benefits from the carbon nanotubes of the present invention, such as scanners, photocopying machines, LCD halogen lights, and automobile lights among others.

Figure 5:
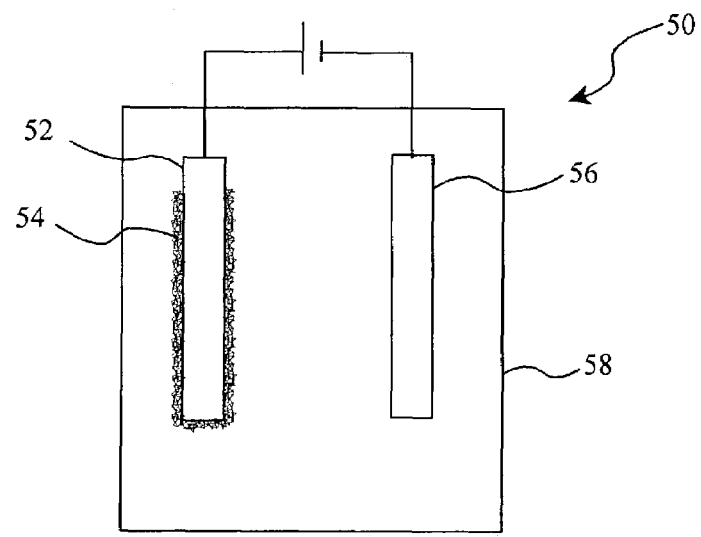
FIG. 5 shows a side view of a carbon nanotube device in accordance with one embodiment of the present invention using a liquid medium.

Moreover, carbon nanotubes may be incorporated into a variety of other ordinary electrodes to facilitate the flow of electrons. Such electrodes may be used in batteries and electro-deposition of metals, such as electroplating, chemical vapor deposition, and the like. In one aspect, the electrodes may be used in an aqueous solution. For example, electrodes that are used to monitor the quality of water or other food stuff, such as juice, beer, soda, etc. by measuring the resistivity of the water. Due to its anti-corrosive properties, electrodes of carbon nanotubes pose a significant advantage over conventional electrodes. Referring now to FIG. 5, a fuel cell, shown generally at 50, is shown in accordance with one aspect of the present invention. A cathode 52 is coated with carbon nanotubes 54 over at least a portion of the cathode. An anode 56 is placed in a conductive relationship with the cathode within a protective housing 58. A fluid medium is placed in a space between the cathode and anode. Fuel cells typically use an electrolyte fluid medium such as aqueous potassium hydroxide, concentrated phosphoric acid, alkali carbonate, zirconium oxides, and a variety of other solutions known to those skilled in the art. The electrolyte solution participates in the transfer of electrons through electrochemical reactions which produce either protons or negative ions, i.e. $H^+$, $OH^-$, $CO_3^{2-}$, $O^{2-}$, etc. The carbon nanotube coated electrode of the present invention provides a porous structure which allows absorption of electrolyte solution. The electrode can also include a catalyst such as nickel, silver, platinum, metal oxides, etc. as required by the particular electrolyte. In addition, the catalyst can be coated on the entire electrode or a portion thereof. For example, catalyst can be deposited only at the growth site of each carbon nanotube such that only electrolyte species which travel the length of the tube are able to electrochemically react with the catalyst. In this way, deactivation and fouling of the catalyst can be avoided by essentially filtering the unwanted chemical species by forming carbon nanotubes of the appropriate diameter. Specifically, typical chemical species used in electrochemical cells range from about 1 to about 50 angstroms. Therefore a coating of carbon nanotubes having a diameter of about 50 angstroms would exclude larger particles from contacting the catalytic sites. Specific nanotube diameters can be chosen based on the electrochemical species present in any particular liquid medium. Other configurations and designs such as stacking multiple cells and the like are known to those skilled in the art and can be used in conjunction with the carbon nanotube electrodes of the present invention.

One particular application where carbon nanotube electrodes would be of significant advantage is in electro-deposition applications such as electrolytic deposition and electrophoretic deposition. Specifically, one problem experienced by most electro-deposition devices is the polarization of the electrode by the absorption of various gasses. However, due to the strongly inert nature of carbon nanotubes, electrodes made therefrom are virtually unpolarizable. Further, this inert nature creates an electric potential in aqueous solution that is much higher than normal. Under normal circumstances, such a voltage would dissociate the water before the water can dissociate the deposition material. However, due to the high potential of carbon nanotubes, the solute contained in the solution is driven out before the water can evaporate. This aspect is very useful, as it enables the electro-deposition of elements with high oxidation potentials, such as Li and Na which has been extremely difficult, if not impossible in the past. Liquid mediums suitable for use in the present invention in conjunction with electrodeposition applications include without limitation aqueous solution of dissolved metals, ceramics, or other compounds. Typical metals used in electrodeposition include transition metals such as Fe, Ni, Co, Cu, Au, Ag, Pd, Sn, Zn and others. The method of the present invention, makes a greater variety of elements suitable for electrodeposition such as Li, Na, K, and the like.

In a similar aspect, because of the high potential achieved by carbon nanotube electrodes in solution, solutes that are present in very minute amounts can be driven out of solution and detected. Therefore, the material of the present invention is also useful as part of a highly sensitive diagnostic tool or sensing device which is capable of measuring the presence of various elements in solution, for example, lead, in amounts as low as parts per billion (ppb). Such applications include the detection of nearly any element that can be driven or attracted to an electrical charge, including biomaterials, such as blood and other bodily fluids, such as urine.

The carbon nanotubes used in the present invention may be made by a variety of processes, including those incorporated by reference above. However, in one aspect, such a process includes thermal decomposition of a carbonaceous gas onto a substrate having a molten metal catalyst layer. A number of processes may be used to accomplish thermal decomposition of the carbonaceous gas, including various chemical vapor deposition (CVD) processes that will be readily recognized by those of ordinary skill in the art. Generally these processes entail decomposing a carbonaceous gas, such as methane, under high temperature and selected pressure conditions, to release carbon atoms from the provided carbon source, and deposit them on the catalyst-coated substrate. The substrate temperature may be as high as 100° C., but with an energy input, such as by energizing with microwave plasma, the substrate temperature may be substantially lowered (e.g. to about 600° C. or less). The catalyst may be only a thin layer of metal catalyst having a thickness of from about several nanometers to about 1 micrometer. The catalyst layer may be created by several techniques known to those skilled in the art, such as sputtering with a metal, spraying with a salt solution (e.g. $FeCl_3$, $NiSO_4$, $Co(NO_3)_2$ dissolved in water), or simply spreading a layer of metal powder on the substrate.

The formation of nanotubes is facilitated by the fact that the molten catalyst dissolves both the carbon atoms and substrate to become a eutectic composition that forms discontinuous droplets covering the substrate. As the saturation point of each droplet is reached, carbon is precipitated out and forms nanotubes because of the droplet nature of the catalyst. The nanotubes may be single-walled or multi-walled, and have varying thicknesses, that are determined by the specific conditions of the CVD process known to those skilled in the art.

A wide variety of catalyst materials may be used in connection with the fabrication of carbon nanotubes in accordance with the present invention. Examples of suitable catalyst materials include without limitation, iron, nickel, cobalt, and alloys thereof. However, in one aspect of the invention, the metal catalyst may be iron.

In one aspect of the present invention, the substrate is an electrode material wherein the resulting nanotube coated electrode has carbon nanotubes grown to form substantially aligned carbon nanotubes. In this embodiment, the concentration of carbon nanotubes is governed by the growth process and is typically very high, i.e. up to 10 billion per $cm^2$. In another detailed aspect of the present invention, the substrate is not necessarily an electrode material. Once the carbon nanotubes are grown they can be removed from the substrate by either mechanical or chemical methods. The removed carbon nanotubes can then be mixed with an organic binder to form a nanotube paste. Suitable binders include without limitation ethylcellulose, nitrocellulose, alcohols such as polyvinyl alcohol, acetates, terpineols, water, and mixtures thereof. The paste can then be applied to an electrode using a brush, by dipping, or other similar methods. Coating the electrodes in this manner avoids some of the material limitations of growing nanotubes such that the paste can be applied to almost any material. Additionally, nanotubes coated using a paste will not be substantially aligned vertically along the surface of the substrate but tend to be somewhat random and may substantially lay nearly horizontal (as shown in FIG. 5). Although vertically upright nanotube orientations are generally preferred for electron emission the ease with which such pastes can be applied makes this an attractive alternative. Further, coating the electrode with a paste containing carbon nanotubes in a particular concentration allows for increased control of the concentration of nanotubes on the final coated surface. Thus, any of the above described applications of the present invention can utilize either carbon nanotubes directly grown on the electrode or coated thereon in a paste.

Of course, it is to be understood that the above-described arrangements are only illustrative of the application of the principles of the present invention. Numerous modifications and alternative arrangements may be devised by those skilled in the art without departing from the spirit and scope of the present invention and the present invention is intended to encompass such arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A carbon nanotube electrical device comprising:
   a) a cathode having a carbon nanotube coating, said carbon nanotube coating comprising either substantially aligned carbon nanotubes grown on the cathode or randomly oriented carbon nanotubes in a binder;
   b) an anode placed in an electrically conductive relationship with the cathode, such that there is a space between the cathode and the anode; and
   c) an energy collector coupled to the cathode opposite the carbon nanotubes, the energy collector configured for collecting thermal, photonic, or phononic energy.

2. The device of claim 1, wherein the carbon nanotubes are grown on the cathode to form the substantially aligned carbon nanotubes.

3. The device of claim 2, wherein the carbon nanotubes have a density up to about 10 billion nanotubes per square centimeter.

4. The device of claim 1, wherein the carbon nanotubes are applied in a binder to the cathode after formation of said nanotubes.

5. The device of claim 1, wherein the space is a positive pressure environment.

6. The device of claim 1, wherein the space is a vacuum environment.

7. The device of claim 1, wherein the device is an electrical generator.

8. The device of claim 1, wherein the device is a cooling device.

9. The device of claim 1, wherein the binder is an organic binder.

10. The device of claim 1, wherein the anode has an ultrasmooth surface.

11. The device of claim 10, wherein the ultrasmooth surface comprises a refractory metal.

12. The device of claim 1, wherein the carbon nanotubes have a length which is at least from about 5 times to about 100 times greater than a diameter of the carbon nanotubes.

13. A method for improving the performance of an electrical device having a cathode, placed in a conductive relationship with an anode and having a space that participates in transferring electrons across the space defined therebetween, comprising the steps of:
   a) coating the cathode with carbon nanotubes configured for emitting electrons, wherein the step of coating includes either growing carbon nanotubes on the cathode to form substantially aligned carbon nanotubes or applying carbon nanotubes in a binder to the cathode after formation of said carbon nanotubes to form a random orientation of carbon nanotubes; and
   b) coupling an energy collector to the cathode opposite the carbon nanotubes, the energy collector being configured for collecting thermal, photonic, or phononic energy.

14. The method of claim 13, wherein the cathode operates at a temperature below about 65° C.

15. The method of claim 13, wherein the carbon nanotubes are attached by growing carbon nanotubes on the cathode to form substantially aligned carbon nanotubes.

16. The method of claim 13, wherein the carbon nanotubes are attached to the cathode by forming a mixture of carbon nanotubes and a binder and then applying said mixture to the cathode.

17. The method of claim 13, wherein the device is an electrical generator.

18. The method of claim 13, wherein the device is a cooling device.

* * * * *